F. L. MORSE.
VALVE MECHANISM.
APPLICATION FILED APR. 1, 1913. RENEWED FEB. 18, 1915.

1,156,920.

Patented Oct. 19, 1915.

WITNESSES
F. Diehl
A. S. Fowler

INVENTOR
Frank L. Morse.
BY Edward H. Wright
ATTORNEY

UNITED STATES PATENT OFFICE.

FRANK L. MORSE, OF ITHACA, NEW YORK.

VALVE MECHANISM.

1,156,920.   Specification of Letters Patent.   Patented Oct. 19, 1915.

Application filed April 1, 1913, Serial No. 758,154.   Renewed February 18, 1915.   Serial No. 9,180.

*To all whom it may concern:*

Be it known that I, FRANK L. MORSE, a citizen of the United States, residing at Ithaca, in the county of Tompkins and State of New York, have invented a certain new and useful Improvement in Valve Mechanism, of which improvement the following is a specification.

This invention relates to mechanism for operating valves of the character employed in connection with continuously operated machines, such as the distribution valves for steam engines, gas engines, other fluid pressure motors, pumps, and the like, or wherever a valve is operated continuously through a succession of complete traverses or movements in each of which the valve, or any given point thereof, may be said to describe the same path upon its seat, at each successive traverse or movement.

In valves of this character the wear between the valve and its seat may be uneven due to the fact that each point passes over the same path upon the seat at each successive movement and such points or spots as cause greater wear than others tend to produce grooves in the surface of the seat, this being especially marked where particles of foreign matter gain access between the valve and seat. Such action then causes a leaky condition of the valve, requiring frequent regrinding or refitting of the valves.

The principal object of my invention is to avoid such a condition by providing a valve mechanism in which the valve shall have a continuous polishing action upon the seat, that is, the movement between these parts shall be such as to continuously change the successive paths of the valve, or any given point thereof, upon the valve seat whereby the surfaces will be worn uniformly smooth, and broadly stated, my invention comprises means for thus changing or shifting the paths described in the successive traverses or movements of the valve relative to the seat.

Figure 1:
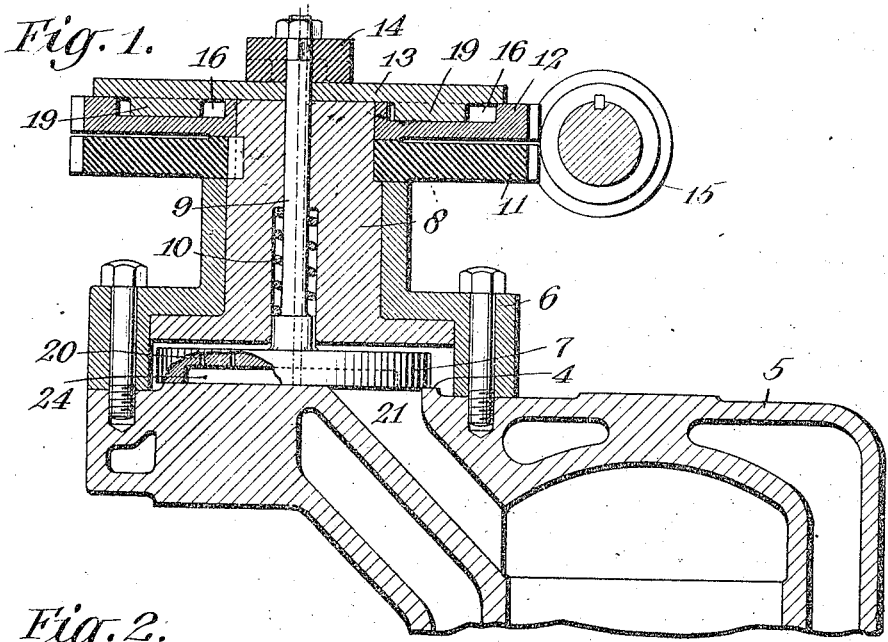
Figure 2:
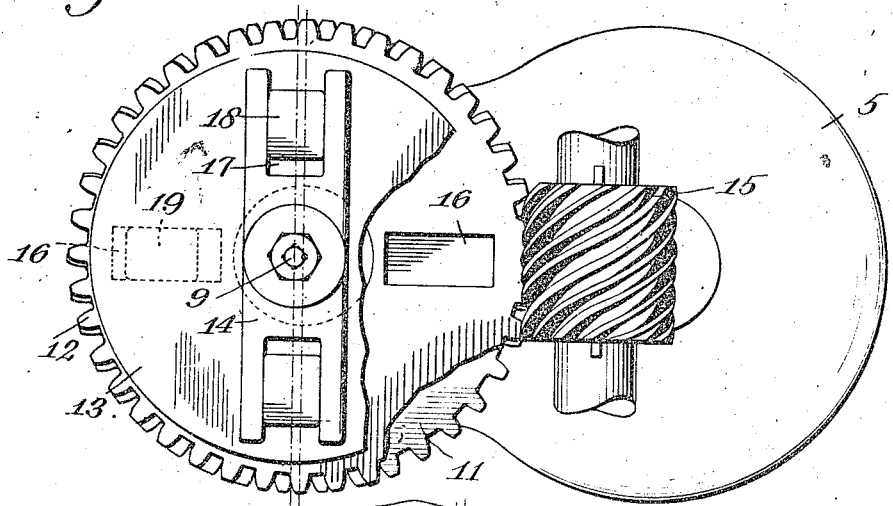
Figure 3:
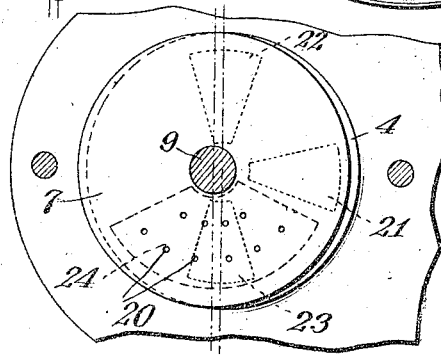

My invention is applicable to any of the various types of valves for fluid pressure motors or pumps, such as reciprocating or rotary slide valves, rotatory or oscillating cylindrical valves, piston valves, disk valves, etc., but I have herein illustrated the same in connection with a rotary disk or slide valve for a gas engine, and in the accompanying drawing, Figure 1 is a substantially central vertical section of one such mechanism embodying my improvement; Fig. 2, a plan of same with one of the gears partly broken away; and Fig. 3, a plan of the valve and seat.

According to the construction shown in the drawing, the disk valve, 7, is mounted to rotate upon the seat, 4, within a casing, 6, and to control a fluid supply port, 22, exhaust port, 23, and cylinder port, 21, of the engine cylinder, 5, by means of a cavity, 24, formed in the face of the valve, which cavity may have balancing ports, 20, extending through the top of the valve. The stem, 9, of the valve extends through and rotates within the shifting member, 8, which in this case, is rotatably mounted in the casing, 6, the valve and stem, however, being eccentric to the shifting member an amount indicated by the distance between the parallel dotted lines upon the figures of the drawing. A spring, 10, may be located between the member, 8, and the valve for normally holding the latter upon its seat.

At the upper end of the shifting member, 8, are mounted two gear wheels, the lower one, 11, being keyed fast to the member, 8, and the upper one, 12, being loosely mounted to revolve on said member, and both being driven by the helical gear or worm, 15. The two gear wheels have a different number of teeth, in this case the upper gear having forty and the lower gear thirty eight, whereby they are rotated at different speeds, and a flexible or universal coupling is made between the upper gear and the valve stem in order to accommodate the shifting movement in the relative positions of the parts. As shown in the drawing, such a universal coupling comprises the plate, 13, having projections, 19, on its lower side operating in rectangular recesses, 16, in the gear, 12, and provided on its upper side with projections, 18, operating in recesses, 17, of the head, 14, fixed upon the valve stem, 9.

As the worm, 15, is adapted to be driven from the engine by any suitable connecting mechanism, (not shown), it will be apparent that the valve stem and valve will be operated at the desired speed by the gear connection, 12, through its succession of complete traverses or revolutions and effect the proper control of the opening and closing of the admission and exhaust ports whereby the engine operates continuously in the usual way. At the same time, however, that the valve is turned through its successive traverses or revolutions, it will be noted that the shifting member, 8, is also rotated, but at a different speed through the gear, 11, and consequently the center of rotation and the bearing of the valve stem in said member is constantly shifted so that the path of movement of the valve, or of any given point on its face, constantly changes through its successive rotations relative to the valve seat and produces what may be termed a gyratory motion with a continuous grinding or polishing action.

In this way the valve seat is worn perfectly smooth at all times and there will be no leakage due to irregular wear between the valve and its seat.

Having now described my invention, what I claim as new and desire to secure by Letters Patent is:

1. A valve mechanism comprising a valve having a movement in a succession of complete traverses, and means coöperating with the valve operating mechanism for shifting the path described in each successive traverse.

2. A valve mechanism comprising a continuously operating valve moving in a succession of complete traverses, and means operating automatically to shift the path of each successive traverse.

3. A valve mechanism comprising a continuously operating valve moving in a succession of complete traverses, and means coöperating with the valve operating mechanism for changing the paths of the successive traverses relative to each other.

4. A valve mechanism comprising a continuously operating valve moving in a succession of complete traverses in one direction, and means coöperating with the valve operating mechanism for imparting a relatively transverse movement to the valve at the same time to change the paths of the successive traverses relative to each other.

5. A valve mechanism comprising a rotary valve with means for rotating the same, and a shifting device coöperating with said rotating means for changing the paths described by any point on the valve during the successive revolutions.

6. A valve mechanism comprising a disk valve with means for rotating the same, and a shifting device for changing the position of its center of rotation during its successive revolutions on its seat.

7. A valve mechanism comprising a rotatably mounted shifting member, a rotary valve mounted on said shifting member, and means for driving said valve and said shifting member at different speeds.

8. A valve mechanism comprising a rotatably mounted shifting member having a driving gear wheel, a rotary valve mounted on said member, a gear wheel for driving said valve, and another gear driving both of said gear wheels.

9. A valve mechanism comprising a rotatably mounted shifting member, a driving gear wheel for said member, a rotary valve mounted on said member, a driving gear wheel for said valve, said gear wheels having a different number of teeth, and a worm wheel for driving both gear wheels.

10. A valve mechanism comprising a rotatably mounted shifting member having a driving gear keyed thereto, a rotary valve having a stem extending through said member, a gear for driving said valve, a universal connection between said gear and the valve stem, said gears having a different number of teeth, and a worm gear driving both of the other gears.

FRANK L. MORSE.

Witnesses:
P. C. COLT,
D. B. PERRY.